United States Patent
Qin et al.

(10) Patent No.: US 12,258,361 B2
(45) Date of Patent: Mar. 25, 2025

(54) DIRECTIONALLY ASSEMBLED FLEXIBLE MOF HYDROGEL, AND PREPARATION METHOD AND PROTON CONDUCTION APPLICATION THEREOF

(71) Applicants: Zhejiang University of Technology., Hangzhou (CN); Eco-Environmental Science Research & Design Institute of Zhejiang Province., Hangzhou (CN)

(72) Inventors: Lei Qin, Hangzhou (CN); Xiaoyan Mao, Huzhou (CN); Yingyu Tan, Hangzhou (CN); Fei Huang, Hangzhou (CN); Liang Zhang, Yuncheng (CN); Yu Zhang, Hangzhou (CN); Xingwei Xiang, Huzhou (CN)

(73) Assignees: Zhejiang University of Technology, Hangzhou (CN); Eco-Environmental Science Research & Design Institute of Zhejiang Province, Hangzhou (CN)

( * ) Notice: Subject to any disclaimer, the term of this patent is extended or adjusted under 35 U.S.C. 154(b) by 0 days.

(21) Appl. No.: 18/654,004

(22) Filed: May 3, 2024

(65) Prior Publication Data
US 2024/0383926 A1 Nov. 21, 2024

(30) Foreign Application Priority Data
May 15, 2023 (CN) .......................... 202310554989.X

(51) Int. Cl.
C07F 7/00 (2006.01)
C07F 15/02 (2006.01)
C07F 15/06 (2006.01)

(52) U.S. Cl.
CPC ............ C07F 7/003 (2013.01); C07F 15/025 (2013.01); C07F 15/065 (2013.01)

(58) Field of Classification Search
CPC ....... C07F 7/003; C07F 15/025; C07F 15/065
See application file for complete search history.

(56) References Cited

U.S. PATENT DOCUMENTS

2015/0150981 A1* 6/2015 Gref .......................... C07F 3/06
514/777

FOREIGN PATENT DOCUMENTS

CN 111389235 A * 7/2020

OTHER PUBLICATIONS

Sun et al., "Advances in metal-organic framework-based hydrogel materials: preparation, properties, and applications", Journal of Materials Chermistry A, 11, pp. 2092-2127. (Year: 2023).*

(Continued)

*Primary Examiner* — Matthew E. Hoban
*Assistant Examiner* — Lynne Edmondson

(57) ABSTRACT

Provided are a directionally assembled flexible MOF hydrogel, a preparation method and a proton conduction application thereof. The prepared method includes: mixing a transition metal salt and L-Glu to prepare a mixed aqueous solution; putting the mixed aqueous solution into a reaction kettle to react at a constant reaction temperature in a range from 80° C. to 200° C. for a reaction period of 1-5 hours, to thereby obtain a reacted aqueous solution; cooling the reacted aqueous solution to room temperature; and washing the reacted aqueous solution after the cooling with deionized water and absolute ethanol, to thereby obtain the directionally assembled flexible MOF hydrogel, L-Glu-M (M=Zr, Fe, or Co), for sealing and storing. The preparation method is simpler and easier to operate, and the directionally assembled flexible MOF hydrogel has great prospects in the field of proton conducting technologies.

8 Claims, 1 Drawing Sheet

(56) References Cited

OTHER PUBLICATIONS

Machine translation of CN-111389235-A, 16 pages. (Year: 2020).*

* cited by examiner

1

DIRECTIONALLY ASSEMBLED FLEXIBLE MOF HYDROGEL, AND PREPARATION METHOD AND PROTON CONDUCTION APPLICATION THEREOF

CROSS-REFERENCE TO RELATED APPLICATION

This application claims priority to a Chinese patent application No. CN 202310554989.X, filed to China National Intellectual Property Administration (CNIPA) on May 15, 2023, which is herein incorporated by reference in its entirety.

TECHNICAL FIELD

The disclosure relates to the field of proton conducting technologies, particularly to a directionally assembled flexible metal-organic framework (MOF) hydrogel and a preparation method thereof.

BACKGROUND

In recent years, due to the increasingly serious energy and environmental problems, proton conductive materials have attracted more and more attention in the field of energy conversion and storage. Solid acid, which is represented by a chemical formula $M_aH_b(XO_4)_c$, where M represents a monovalent or divalent cation, $XO_4$ represents a tetrahedral oxoanion, and a, b and c are integers, is a good proton conductive material. Even though the solid acid can have a higher conductivity through phase structure transformation at a higher temperature, water solubility and thermal instability thereof limit its practical application.

Even through some research has arrived at a theory that an oxide-based proton conductor has good conductivity at a higher temperature, some scholars have come to an opposite conclusion by studying a same material. As such, this theory is flawed, and still in a research and exploration stage.

At present, metal-organic frameworks (MOFs) materials show excellent performance in the field of proton conducting technologies, which have attracted the attention of researchers. Ordered pores of the MOFs materials can provide an effective path for proton shuttle mechanism (also known as Grotthuss mechanism), and a proton conductivity of the MOFs materials can be effectively improved by embedding proton donors and proton acceptors. Further, after proton donors are grafted to the MOFs materials or proton acceptor functional groups are connected to the MOFs materials, proton jumping points can be increased to achieve efficient transfer, and thereby achieve a higher proton conductivity. In addition, the MOFs materials have the advantages of structural designability, easy pore adjustment, and easy functional modification. Therefore, the MOFs materials have great prospects in the field of proton conducting technologies. However, most of MOFs proton conductive materials have poor water stability and are highly dependent on a content of water molecules in their pores. The water molecules in the pores can escape at a higher temperature, which leads to a sharp decline in the proton conductivity, greatly limiting a practical application of the MOFs proton conductive materials.

Therefore, it is particularly important to design a high-conductivity material with good stability and good water retention performance at a higher temperature.

SUMMARY

An objective of the disclosure is to provide a high-conductivity material applied to proton conduction and with good stability and good water retention performance at a higher temperature, and a preparation method thereof.

Technical Solutions of the Disclosure are as Follows

In an aspect, a preparation method of a directionally assembled flexible metal-organic framework (MOF) hydrogel is provided according to an embodiment of the disclosure, which includes: mixing a transition metal salt and L-Glutamic acid (L-Glu) to obtain a mixed aqueous solution; putting the mixed aqueous solution into a reaction kettle to act at a constant reaction temperature in a range from 80° C. to 200° C. for a reaction period of 1-5 hours, to thereby obtain a reacted aqueous solution after the reacting is completed; cooling the reacted aqueous solution to room temperature (for example, in a range from 18° C. to 26° C.); and washing the reacted aqueous solution after the cooling with deionized water and absolute ethanol, to thereby obtain the directionally assembled flexible MOF hydrogel for sealing and storing; where the transition metal salt is one selected from the group consisting of a zirconium salt, an iron salt, and a cobalt salt.

In an embodiment, the zirconium salt is zirconium sulfate, such as $Zr(SO_4)_2 \cdot H_2O$; the iron salt is ferric chloride, such as $FeCl_3$ or $FeCl_3 \cdot 6H_2O$; and the cobalt salt is cobalt nitrate, such as $Co(NO_3)_2$ or $CO(NO_3)_2 \cdot 6H_2O$.

In an embodiment, a molar ratio of the L-Glu to the transition metal salt is in a range from 1:2 to 3:1. In a specific embodiment, the molar ratio of the L-Glu to the transition metal salt is 1:2.

In an embodiment, a concentration of the transition metal salt in the mixed aqueous solution is in a range from 1 mole per liter (mol/L) to 6 mol/L. In a specific embodiment, the concentration of the transition metal salt in the mixed aqueous solution is 4 mol/L.

In an embodiment, the constant reaction temperature is 150° C., and the reaction period is 2 hours.

In another aspect, a directionally assembled flexible MOF hydrogel is provided according to an embodiment of the disclosure, which is prepared by any one of the above preparation methods.

The directionally assembled flexible MOF hydrogel disclosed by the disclosure has a higher conductivity under the condition of a higher humidity, and thus can be used as a proton conductive material.

The disclosure has at least the following advantages.
1. The L-Glu-M (M=zirconium (Zr), iron (Fe), or cobalt (Co)) material has a higher conductivity.
2. The preparation method for the L-Glu-M (M=Zr, Fe, or Co) material is simpler, easier to operate, and pollution-free.

DETAILED DESCRIPTION OF EMBODIMENTS

Figure 1:
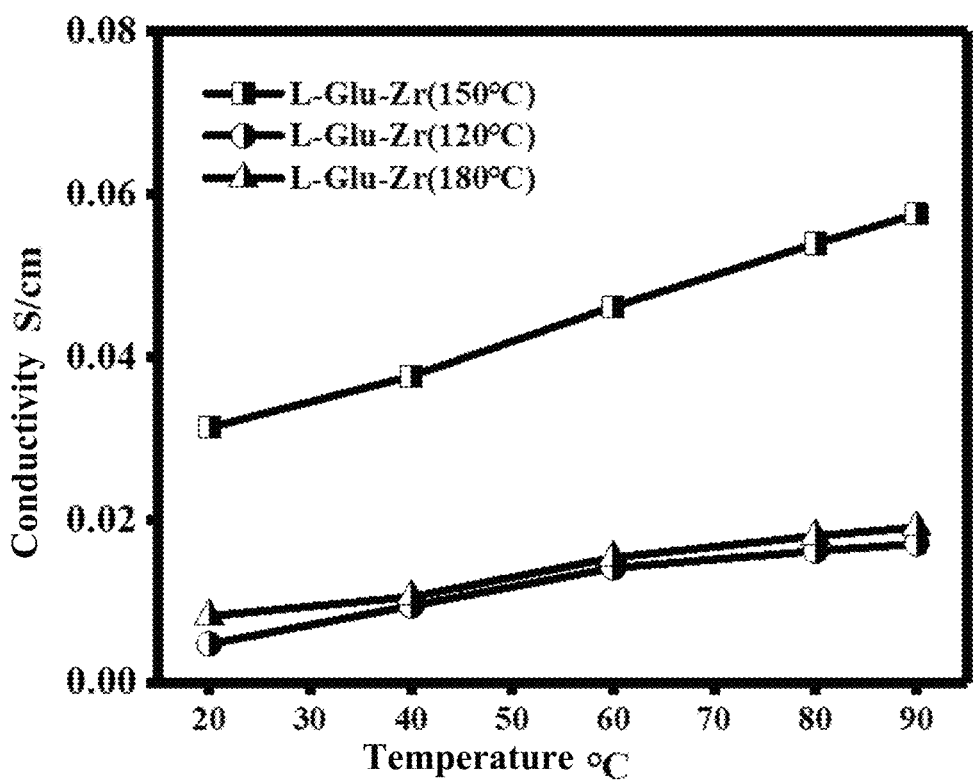
FIG. 1 illustrates a schematic diagram showing conductivities of L-Glu-M materials obtained through embodiments 1, 6, and 7 under different temperature conditions.
Figure 2:
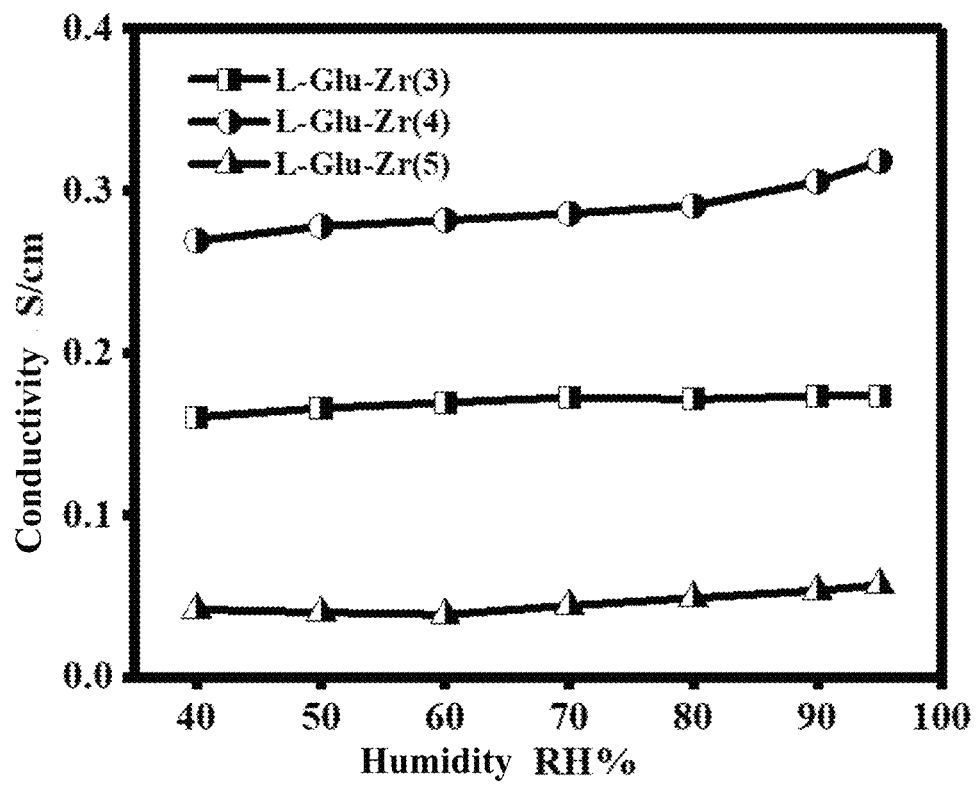
FIG. 2 illustrates a schematic diagram showing conductivities of L-Glu-M materials obtained through embodiments 3-5 under different humidity conditions.

The disclosure will be further explained in detail in combined with embodiments and accompanying drawings hereinafter. It should be understood that the disclosure can be varied in different embodiments without departing from the scope of protection of the disclosure, and the description and the accompanying drawings herein are merely for illustration, but not for limitation of the disclosure.

Embodiment 1

In the embodiment 1, L-Glu-Zr (1) is prepared through the following steps. A zirconium sulfate solution with a concentration of 1 mol/L is prepared. L-Glu is added into the zirconium sulfate solution and then stirred until clear to obtain a mixed aqueous solution, a molar ratio of zirconium sulfate in the zirconium sulfate solution to the L-Glu being 2:1. The mixed aqueous solution is put into a reaction kettle to react at a constant reaction temperature of 150° C. for a reaction period of 2 hours, to thereby obtain a reacted aqueous solution after the reacting is completed. The reacted aqueous solution is washed with deionized water and anhydrous ethanol for three times to thereby obtain the L-Glu-Zr (1), which is also referred to as L-Glu-Zr (150° C.).

Embodiment 2

In the embodiment 2, L-Glu-Zr (2) is prepared through the following steps. A zirconium sulfate solution with a concentration of 2 mol/L is prepared. L-Glu is added into the zirconium sulfate solution and then stirred until clear to obtain a mixed aqueous solution, a molar ratio of zirconium sulfate in the zirconium sulfate solution to the L-Glu being 2:1. The mixed aqueous solution is put into a reaction kettle to react at a constant reaction temperature of 150° C. for a reaction period of 2 hours, to thereby obtain a reacted aqueous solution after the reacting is completed. The reacted aqueous solution is washed with deionized water and anhydrous ethanol for three times to thereby obtain the L-Glu-Zr (2).

Embodiment 3

In the embodiment 3, L-Glu-Zr (3) is prepared through the following steps. A zirconium sulfate solution with a concentration of 3 mol/L is prepared. L-Glu is added into the zirconium sulfate solution and then stirred until clear to obtain mixed aqueous solution, a molar ratio of zirconium sulfate in the zirconium sulfate solution to the L-Glu being 2:1. The mixed aqueous solution is put into a reaction kettle to react at a constant reaction temperature of 150° C. for a reaction period of 2 hours, to thereby obtain a reacted aqueous solution after the reacting is completed. The reacted aqueous solution is washed with deionized water and anhydrous ethanol for three times to thereby obtain the L-Glu-Zr (3).

Embodiment 4

In the embodiment 4, L-Glu-Zr (4) is prepared through the following steps. A zirconium sulfate solution with a concentration of 4 mol/L is prepared. L-Glu is added into the zirconium sulfate solution and then stirred until clear to obtain mixed aqueous solution, a molar ratio of zirconium sulfate in the zirconium sulfate solution to the L-Glu being 2:1. The mixed aqueous solution is put into a reaction kettle to act at a constant reaction temperature of 150° C. for a reaction period of 2 hours, to thereby obtain a reacted aqueous solution after the reacting is completed. The reacted aqueous solution is washed with deionized water and anhydrous ethanol for three times to thereby obtain the L-Glu-Zr (4).

Embodiment 5

In the embodiment 5, L-Glu-Zr (5) is prepared through the following steps. A zirconium sulfate solution with a concentration of 5 mol/L is prepared. L-Glu is added into the zirconium sulfate solution and then stirred until clear to obtain mixed aqueous solution, a molar ratio of zirconium sulfate in the zirconium sulfate solution to the L-Glu being 2:1. The mixed aqueous solution is put into a reaction kettle to react at a constant reaction temperature of 150° C. for a reaction period of 2 hours, to thereby obtain a reacted aqueous solution after the reacting is completed. The reacted aqueous solution is washed with deionized water and anhydrous ethanol for three times to thereby obtain the L-Glu-Zr (5).

Embodiment 6

In the embodiment 6, L-Glu-Zr (120° C.) is prepared through the following steps. A zirconium sulfate solution with a concentration of 1 mol/L is prepared. L-Glu is added into the zirconium sulfate solution and then stirred until clear to obtain mixed aqueous solution, a molar ratio of zirconium sulfate in the zirconium sulfate solution to the L-Glu being 2:1. The mixed aqueous solution is put into a reaction kettle to act at a constant reaction temperature of 120° C. for a reaction period of 2 hours, to thereby obtain a reacted aqueous solution after the reacting is completed. The reacted aqueous solution is washed with deionized water and anhydrous ethanol for three times to thereby obtain the L-Glu-Zr (120° C.).

Embodiment 7

In the embodiment 7, L-Glu-Zr (180° C.) is prepared through the following steps. A zirconium sulfate solution with a concentration of 1 mol/L is prepared. L-Glu is added into the zirconium sulfate solution and then stirred until clear to obtain mixed aqueous solution, a molar ratio of zirconium sulfate in the zirconium sulfate solution to the L-Glu being 2:1. The mixed aqueous solution is put into a reaction kettle to react at a constant reaction temperature of 180° C. for a reaction period of 2 hours, to thereby obtain a reacted aqueous solution after the reacting is completed. The reacted aqueous solution is washed with deionized water and anhydrous ethanol for three times to thereby obtain the L-Glu-Zr (180° C.).

Embodiment 8

In the embodiment 8, L-Glu-Fe is prepared through the following steps. A ferric chloride solution with a concentration of 3 mol/L is prepared. L-Glu is added into the ferric chloride solution and then stirred until clear to obtain mixed aqueous solution, a molar ratio of zirconium sulfate in the zirconium sulfate solution to the L-Glu being 2:1. The mixed aqueous solution is put into a reaction kettle to react at a constant reaction temperature of 150° C. for a reaction period of 2 hours, to thereby obtain reacted aqueous solution after the reacting is completed. The reacted aqueous solution is washed with deionized water and anhydrous ethanol for three times to thereby obtain the L-Glu-Fe.

Embodiment 9

In the embodiment 9, L-Glu-Co is obtained through the following steps. A cobalt nitrate solution with a concentration of 3 mol/L is prepared. L-Glu is added into the cobalt nitrate solution and then stirred until clear to obtain mixed aqueous solution, a molar ratio of zirconium sulfate in the zirconium sulfate solution to the L-Glu being 2:1. The mixed aqueous solution is put into a reaction kettle to react at a constant reaction temperature of 150° C. for a reaction period of 2 hours, to thereby obtain a reacted aqueous solution after the reacting is completed. The reacted aqueous solution is washed with deionized water and anhydrous ethanol for three times to thereby obtain the L-Glu-Co.

The obtained L-Glu-M (M=Zr, Fe or Co) materials in the embodiments 1-9 are made into cylinders with a radius of 1 centimeter (cm) and a height of 2 millimeters, and conductivities thereof are measured under different environment temperatures and environment humidities, as illustrated in Tables 1 and 2.

TABLE 1

Conductivities of L-Glu-M materials under different environment temperatures

| Environment temperature (° C.) | Conductivity (siemens per centimeter (S/cm)) | | | | |
|---|---|---|---|---|---|
| | Embodiment 1 | Embodiment 6 | Embodiment 7 | Embodiment 8 | Embodiment 9 |
| 20 | 0.03132 | 0.00472 | 0.00815 | 0.00136 | 0.00086 |
| 40 | 0.03765 | 0.00942 | 0.01053 | 0.00245 | 0.00102 |
| 60 | 0.04619 | 0.01407 | 0.01535 | 0.00257 | 0.00235 |
| 80 | 0.05392 | 0.01614 | 0.01799 | 0.00281 | 0.00272 |
| 90 | 0.05757 | 0.01703 | 0.01907 | 0.00334 | 0.00311 |

TABLE 2

Conductivities of L-Glu-M materials under different environment humidities

| Environment humidity (relative humidity (RH)%) | Conductivity (S/cm) | | |
|---|---|---|---|
| | Embodiment 3 | Embodiment 4 | Embodiment 5 |
| 40 | 0.16043 | 0.26921 | 0.04166 |
| 50 | 0.16579 | 0.27798 | 0.03988 |
| 60 | 0.16938 | 0.28178 | 0.03847 |
| 70 | 0.17246 | 0.28594 | 0.04404 |
| 80 | 0.71310 | 0.29069 | 0.04867 |
| 90 | 0.17327 | 0.30562 | 0.05329 |
| 95 | 0.17333 | 0.31831 | 0.05675 |

What is claimed is:

1. A preparation method of a directionally assembled flexible metal-organic framework (MOF) hydrogel, comprising:
    mixing a transition metal salt and L-Glutamic acid (L-Glu) to prepare a mixed aqueous solution; putting the mixed aqueous solution into a reaction kettle to react at a constant reaction temperature in a range from 80° C. to 200° C. for a reaction period of 1-5 hours, to thereby obtain a reacted aqueous solution after the reacting is completed; cooling the reacted aqueous solution to room temperature; and washing the reacted aqueous solution after the cooling with deionized water and absolute ethanol, to thereby obtain the directionally assembled flexible MOF hydrogel for sealing and storing; and
    making the directionally assembled flexible MOF hydrogel into a cylinder and measuring a conductivity of the cylinder under an environment temperature, wherein the conductivity of the cylinder increases with an increase of the environment temperature;
    wherein a molar ratio of the L-Glu to the transition metal salt is 1:2, and the transition metal salt is one selected from the group consisting of a zirconium salt, an iron salt, and a cobalt salt.

2. The preparation method of the directionally assembled flexible MOF hydrogel as claimed in claim 1, wherein the zirconium salt is zirconium sulfate, the iron salt is ferric chloride, and the cobalt salt is cobalt nitrate.

3. The preparation method of the directionally assembled flexible MOF hydrogel as claimed in claim 1, wherein a concentration of the transition metal salt in the mixed aqueous solution is in a range from 1 mole per liter (mol/L) to 6 mol/L.

4. The preparation method of the directionally assembled flexible MOF hydrogel as claimed in claim 1, wherein the constant reaction temperature is 150° C., and the reaction period is 2 hours.

5. The preparation method of the directionally assembled flexible MOF hydrogel as claimed in claim 1, wherein the transition metal salt is the zirconium salt, and a conductivity of the directionally assembled flexible MOF hydrogel prepared at the constant reaction temperature of 180° C. is less than a conductivity of the directionally assembled flexible MOF hydrogel prepared at the constant reaction temperature of 150° C., and greater than a conductivity of the directionally assembled flexible MOF hydrogel prepared at the constant reaction temperature of 120° C.

6. The preparation method of the directionally assembled flexible MOF hydrogel as claimed in claim 1, wherein the transition metal salt is the zirconium salt, and a conductivity of the directionally assembled flexible MOF hydrogel prepared with the zirconium salt at a concentration of 3 mol/L is less than a conductivity of the directionally assembled flexible MOF hydrogel prepared with the zirconium salt at a concentration of 4 mol/L, and greater than a conductivity of the directionally assembled flexible MOF hydrogel prepared with the zirconium salt at a concentration of 5 mol/L.

7. The preparation method of the directionally assembled flexible MOF hydrogel as claimed in claim 1, wherein the environment temperature is in a range from 20° C. to 90° C.

8. The preparation method of the directionally assembled flexible MOF hydrogel as claimed in claim 1, wherein the cylinder is with a radius of 1 centimeter and a height of 2 millimeters.

* * * * *